(12) United States Patent
Schneider (10) Patent No.: US 9,762,569 B2
(45) Date of Patent: Sep. 12, 2017

(54) NETWORK AUTHENTICATION (71) Applicant: NOKIA SOLUTIONS AND NETWORKS OY, Espoo (FI)

(72) Inventor: Peter Schneider, Holzkirchen (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 127 days.

(21) Appl. No.: 14/435,578

(22) PCT Filed: Oct. 15, 2012

(86) PCT No.: PCT/EP2012/070422
§ 371 (c)(1),
(2) Date: Apr. 14, 2015

(87) PCT Pub. No.: WO2014/060013
PCT Pub. Date: Apr. 24, 2014

(65) Prior Publication Data
US 2015/0264040 A1 Sep. 17, 2015

(51) Int. Cl.
*G06F 21/00* (2013.01)
*H04L 29/06* (2006.01)
*H04L 9/32* (2006.01)

(52) U.S. Cl.
CPC ........ *H04L 63/0823* (2013.01); *H04L 9/3265* (2013.01)

(58) Field of Classification Search
CPC ............. H04L 63/08323; H04L 9/3265; H09L 9/3263
See application file for complete search history.

(56) References Cited

U.S. PATENT DOCUMENTS 8,054,761 B2 * 11/2011 Thomas .............. H04L 63/0823 370/252
8,301,880 B2 * 10/2012 Jennings ............. H04L 63/0823 713/156

(Continued)

FOREIGN PATENT DOCUMENTS

EP 2 296 392 A1 3/2011

OTHER PUBLICATIONS

Konstantin Shemyak et al., "Secure Delivery of equipment identity from vendor to operator," New Technologies, Mobility and Security (NTMS), 2011 4th IFIP International Conference, IEEE, Feb. 7, 2011, pp. 1-5, XP031982199.

(Continued)

*Primary Examiner* — Sharon Lynch
(74) *Attorney, Agent, or Firm* — Squire Patton Boggs (US) LLP (57) ABSTRACT

The present invention addresses apparatuses, methods and computer program product for providing improved authentication of a network by a network node. A network node identification and a vendor certificate are configured in a network node, a usage certificate is created for the network node, which is signed by the vendor with a signature, and contains verification information indicating that the usage certificate relates to this network node and authentication information for allowing the network node to authenticate a network, the usage certificate is transmitted to an operator of an operator network, the network node requests the usage certificate from the operator, when the network node is initially connected to the operator network, the network node determines validity of the signature in the usage certificate received upon the request, and the network node checks whether the received usage certificate actually relates to the network node being initially connected to the operator (Continued)

network, based on the information contained in the usage certificate.

19 Claims, 4 Drawing Sheets

(56) References Cited

U.S. PATENT DOCUMENTS

| | | | | |
|---|---|---|---|---|
| 8,627,064 | B2* | 1/2014 | Salvarani | H04L 9/321 |
| | | | | 713/156 |
| 9,131,473 | B2* | 9/2015 | Wang | H04L 41/28 |
| 9,197,420 | B2* | 11/2015 | Cross | H04L 63/0823 |
| 9,288,672 | B2* | 3/2016 | Benoit | H04W 12/06 |
| 2002/0108041 | A1* | 8/2002 | Watanabe | H04L 9/3252 |
| | | | | 713/175 |
| 2004/0148505 | A1* | 7/2004 | Qiu | G06F 21/33 |
| | | | | 713/175 |
| 2009/0323954 | A1* | 12/2009 | Sprunk | G06F 21/606 |
| | | | | 380/259 |
| 2010/0070771 | A1* | 3/2010 | Chen | H04L 63/0823 |
| | | | | 713/176 |
| 2010/0185849 | A1* | 7/2010 | Rune | G06F 21/445 |
| | | | | 713/156 |
| 2011/0072261 | A1* | 3/2011 | Thomas | H04L 63/0823 |
| | | | | 713/156 |
| 2011/0113238 | A1* | 5/2011 | Jennings | H04L 63/0823 |
| | | | | 713/156 |
| 2012/0054497 | A1* | 3/2012 | Korhonen | H04L 29/12066 |
| | | | | 713/179 |
| 2012/0246466 | A1* | 9/2012 | Salvarani | H04L 9/321 |
| | | | | 713/156 |
| 2013/0067552 | A1* | 3/2013 | Hawkes | H04L 63/166 |
| | | | | 726/7 |
| 2014/0093081 | A1* | 4/2014 | Hawkes | H04L 63/166 |
| | | | | 380/270 |
| 2014/0094147 | A1* | 4/2014 | Hawkes | H04L 63/166 |
| | | | | 455/411 |

OTHER PUBLICATIONS

International Search Report and Written Opinion dated Jun. 5, 2013 corresponding to International Patent Application No. PCT/EP2012/070422.

3GPP TS 33.310 V11.1.0 (Sep. 2012), Technical Specification, 3rd Generation Partnership Project; Technical Specification Group Services and System Aspects; Network Domain Security (NDS); Authentication Framework (AF) (Release 11), Sep. 19, 2012, pp. 1-53, XP050649229.

3GPP TS 33.401 V11.5.0 (Sep. 2012), Technical Specification, 3rd Generation Partnership Project; Technical Specification Group Services and System Aspects; 3GPP System Architecture Evolution (SAE); Security architecture (Release 11), Sep. 19, 2012, pp. 1-121, XP050649230.

* cited by examiner

NETWORK AUTHENTICATION

FIELD OF THE INVENTION

The present invention generally relates to wired or wireless communication networks, and more specifically relates to a method, apparatus and computer program product for enabling improved authentication of a network by a network node.

BACKGROUND

When a network node like a mobile network base station, e.g. an "evolved Node B" (eNB), is delivered from a vendor to an operator, the operator needs methods to integrate the network node into the operator's network in an efficient but still secure way. Efficient means here that the operator does not need to do any configuration of the network node before connecting it initially to the network, but can do all the configuration remotely after the initial connect, in a "plug and play" fashion. This is very important for many operators, in particular when the number of network nodes to be connected to the network is high, as it is often the case when building up or extending a mobile network. Secure means here that the operator can be sure that it is not possible that during the initial network connect, some attacker can gain control over the network node and possibly manipulate it, for example in a way that results in the network node connecting to the operator's network with the attacker as a "man-in-the-middle" between the network node and the operator's network. Note that the interconnection of the network node to the operator network may not be physically protected and/or owned by the operator itself—the network node may even connect to the operator network using the Internet, which is a particular insecure network.

On the other hand, the vendor, who typically delivers network nodes of the same type to different operators, desires an efficient manufacturing process that allows manufacturing all network nodes in a uniform way, without the need to configure the nodes specifically for the operator they are delivered to. So the network nodes cannot be configured with, for example, an operator "root of trust", like a (root) certificate containing a public key of the operator. Therefore, during initial network connect the network nodes cannot verify whether they are really connecting to the correct operator network or to an attacker's network. In the latter case, they would be open to usage and manipulation by the attacker.

According to the prior art, a number of approaches are used or have been discussed (e.g. in 3GPP SA3):

Approach 1) The network nodes are physically connected and are configured remotely without any authentication. This is efficient but provides no security. It may be applicable if the network nodes are connected to the operator via protected, private links (e.g. base stations are connected to a private access network owned by the operator).

Approach 2) The network nodes are manufactured with each an individual id, a private/public key pair and a certificate for the public key signed by a vendor CA (certificate authority), possibly via a chain of intermediate certificates. The vendor CA certificate is known to the operator, e.g. securely transmitted before. When selling a network node, the vendor transmits the id of the network node in a secure way to the operator. This way the operator can authenticate the network node when it is connected to the operator network. This approach has been specified in two variants by 3GPP for the initial enrolment of eNBs (see 3GPP TS 33.310 and TS 33.401):

2a) In addition to the configuration described above, the network node is preconfigured with a public key of the operator, i.e. with an operator certificate. This allows that the network node can authenticate the operator network when it is connected to the operator network initially. Thus, mutual authentication is possible. However, the procedure is not efficient, as the network node must be pre-configured for use in the specific operator network by the vendor or by the operator.

2b) The network node has no operator specific pre-configuration. When it is initially connected to the operator network, the operator network can authenticate the network node (but not vice versa). The operator network provisions an operator certificate remotely during the initial connection. After this step, the network node can authenticate the network using the operator certificate. This is a "plug and play" solution, but leaves open an attack window: At the initial connect, an attacker could trick the network node to connect to a node controlled by the attacker. The attacker could then either just use the network node for his own purposes ("hijacking" the network node), or he may succeed to manipulate the network node in a way that it subsequently connects to the intended operator network, with the attacker still being able to control the network node. This would be a severe security breach for the operator network. 3GPP has considered this vulnerability to be acceptable and has therefore specified this solution as an allowed enrolment variant.

Approach 3) The vendor configures the root certificates of all possible operators into the network nodes. However this approach would not protect one operator against being attacked by another operator. Moreover, it is a problem to have to store a large amount of operator certificates securely within the network nodes.

Approach 4) The vendor signs certificates for all the operator root certificates. However, this approach would not protect one operator against being attacked by another operator. Moreover, it is undesirable to have such a dependency between the operator's and the vendor's PKIs.

Approach 5) The vendor operates a vendor specific "enrolment server". The network nodes are programmed to connect to the vendor enrolment server after initial network connect. With the credentials as described in variant 2 and a vendor root certificate configured in the network node mutual authentication between network node and vendor enrolment server is possible, so a security association can be established and the vendor can provide the operator root certificate to the network node. The big disadvantage of this approach is that the vendor gets involved in the operation of the operator's network this way, and must provide the enrolment server in a way that it is always available and reachable from all the networks the network nodes may be connected to.

SUMMARY OF THE INVENTION

Therefore, in order to overcome the drawbacks of the prior art, it is an object underlying the present invention to provide a network authentication optimization. In particular, it is an object of the present invention to provide a method, apparatus and computer program product for enabling improved authentication of a network by a network node.

According to a first aspect of the present invention, there is provided a method, comprising configuring a network node identification and a vendor certificate in a network node, creating a usage certificate for the network node, which is signed by the vendor with a signature, and contains verification information indicating that the usage certificate relates to this network node and authentication information for allowing the network node to authenticate a network, transmitting the usage certificate to an operator of an operator network, the network node requesting the usage certificate from the operator, when the network node is initially connected to the operator network, the network node determining validity of the signature in the usage certificate received upon the request, and the network node checking whether the received usage certificate actually relates to the network node being initially connected to the operator network, based on the information contained in the usage certificate.

According to a second aspect of the present invention, there is provided an apparatus, which comprises storing means adapted to store a network node identification and a vendor certificate, processing means adapted to request, upon installation of the network node in an operator network, a usage certificate for the network node, which is signed by the vendor with a signature, and contains verification information indicating that the usage certificate relates to this network node and authentication information for allowing the network node to authenticate a network, determination means adapted to determine validity of the signature in the usage certificate received upon the request, and checking means adapted to check whether the received usage certificate actually relates to the network node being initially connected to the operator network, based on the information contained in the usage certificate.

According to a third aspect of the present invention, there is provided a computer program product comprising computer-executable components which, when the program is run, are configured to carry out the method according to the first aspect.

According to further embodiments, the authentication information comprises at least one operator certificate.

According to certain embodiments, the network node identification comprises a single individual network node identification, and it is checked whether the network node identification of the network node being initially connected to the operator network coincides with the single network node identification.

According to further embodiments, the network node identification comprises a plurality of network node identifications, and it is checked whether the network node identification of the network node being initially connected to the operator network is comprised in the plurality of network node identifications.

According to another embodiments of the invention, the usage certificate is not signed directly by the vendor certificate configured in the network node, but is signed by a certificate linked to this certificate via a certificate chain that is comprised in the usage certificate.

According to certain embodiments of the invention, the usage certificate is designated to a specific validity period, and it is checked whether the validity period of received usage certificate has elapsed or not.

According to further embodiments, in case the signature in the usage certificate received upon the request is determined to be invalid and/or the received usage certificate does not relate to the network node being initially connected to the operator network, authenticating the network is prohibited and requesting the usage certificate from the operator is repeated.

According to further embodiments, the usage certificate transmitted to the operator is embedded in the operator network, and is transmitted to the network node via the operator network.

According to certain embodiments of the invention, the usage certificate transmitted to the operator is transmitted to the network node by means outside of the operator network when the network node is initially connected to the operator network.

Advantageous further developments or modifications of the aforementioned exemplary aspects of the present invention are set out in the dependent claims.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

Generally, authentication using public key cryptography is performed as follows: A party A has a private/public key pair. The private key is secret and only known to A. The public key is public. A party B that communicates with A can use A's public key to authenticate A. This is done by a challenge/response mechanism where B challenges A and A proofs possession of the private key. It is important that B has the true public key of A. If an attacker could trick B into believing that a public key provided by the attacker is A's public key, the attacker would subsequently be able to impersonate A (towards B).

Certificates are data records that relate an identity with a public key and are signed by some party. Signing also relies on private/public key pairs. If C uses its private key to sign some data, any other party that knows the public key of C can verify the signature. Again, it is essential that the party verifying the signature really has the true public key of C.

So to verify a certificate one needs the public key of the signing party. Again, this public key is typically provided in a certificate signed by some other party and so on. So there can be a chain of certificates. However, this chain of certificates must be finite (and in practice also be short); it ends with a "root certificate" that is not signed by another party but must be securely provided, e.g. by configuration.

If a party B wants to authenticate a party A in a communication, A sends its certificate and if needed also the certificate chain up to but excluding the root certificate. B can parse the chain of certificates starting with A's certificate and verify all the signatures. To verify the last certificate in the transmitted chain, B needs to know the respective root certificate (i.e. the public key in the root certificate). (It would be pointless for A to transmit the root certificate dynamically, as from the viewpoint of B, a certificate transmitted this way could be faked, and B would have no chance to recognize this unless B is already in possession of the root certificate before.) If all certificates are correct and B trusts the signing parties to sign correct information only, then B can trust A's certificate and can use the public key from A's certificate to authenticate A (by a challenge/response mechanism where A proofs possession of the private key belonging to the public in A's certificate).

If an attacker is able to trick a party B into trusting an attacker's certificate or root certificate cert_a, the attacker can impersonate arbitrary identities towards B by creating certificates that are signed with cert_a.

Therefore, in order to achieve improved network node authentication, according to certain embodiments of the present invention, the new network nodes are manufactured with each an individual id, a vendor root certificate, a private/public key pair and a certificate for the public key signed by a vendor CA (certificate authority). The vendor CA certificate is known to the operator, e.g. securely transmitted before.

Furthermore, when e.g. selling a network node, the vendor creates for this network node a "usage certificate", i.e. information asserting that this network node (with its individual id) is meant to be used only within the network of the operator to which the network node is delivered and must not be used in other networks. The information comprises the network node id and an operator certificate and is signed by the vendor. (The operator certificate must have been securely transmitted from the operator to the vendor before.) The vendor transmits the usage certificate to the operator.

Knowing the network node id from the usage certificate as well as the vendor CA certificate, the operator can authenticate the new network node when it is connected to the operator network and sends its certificate to the operator. (This can be done according to prior art, see Approach 2 mentioned above.)

To authenticate the network, the new network node is programmed to request the usage certificate after initial connection to a network. The operator sends the usage certificate received from the vendor, and the new network node verifies the signature and whether the usage certificate contains the network node's id and then accepts the operator certificate. To facilitate signature verification, the vendor provides the public key (typically in form of a certificate) of the entity signing the usage certificates to the new network nodes during manufacturing, as mentioned above. (The new network node is programmed not to proceed as long as no valid usage certificate is provided.) Using the operator certificate, the new network node can authenticate the operator network, so together with the authentication of the new network node by the operator network, mutual authentication and thus secure connection to the network is possible.

Hence, it is not possible for an attacker to trick the new network node into accepting a manipulated operator certificate, because the vendor will only sign a usage certificate containing a true operator certificate. The new network node cannot be used in a network different from the operator network, since a network will not own the private key belonging to the true operator certificate.

Figure 1:
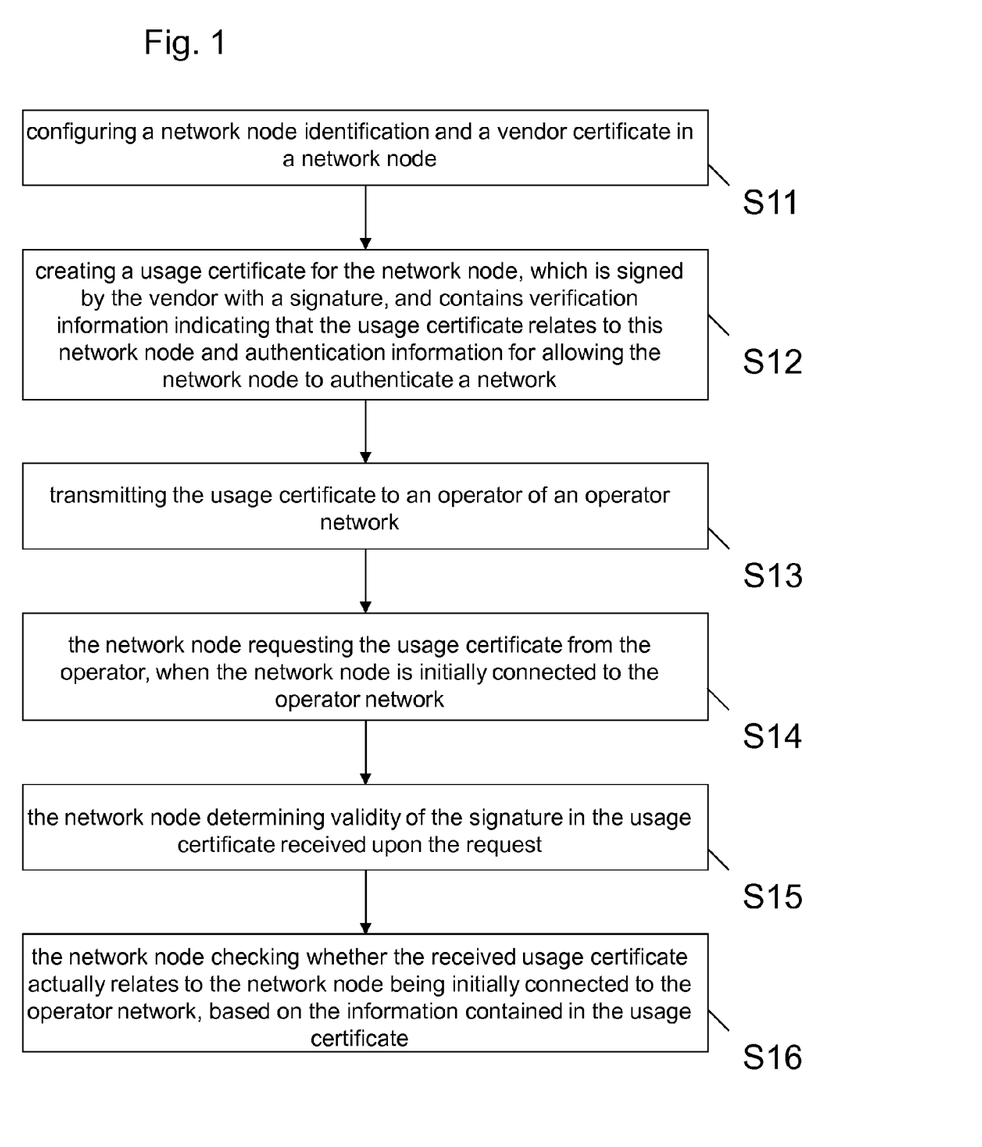
FIG. 1 shows a principle configuration of an example for a method according to certain embodiments of the present invention.

FIG. 1 shows a principle flowchart of an example for a method according to certain embodiments of the present invention.

In Step S11, a network node identification and a vendor certificate are configured in a network node.

In Step S12, a usage certificate is created for the network node, which is signed by the vendor with a signature, and contains verification information indicating that the usage certificate relates to this network node and authentication information for allowing the network node to authenticate a network.

In Step S13, the usage certificate is transmitted to an operator of an operator network.

In Step S14, the network node requests the usage certificate from the operator, when the network node is initially connected to the operator network.

In Step S15, the network node determines validity of the signature in the usage certificate received upon the request.

In Step S16, the network node checks whether the received usage certificate actually relates to the network node being initially connected to the operator network, based on the information contained in the usage certificate.

Figure 2:
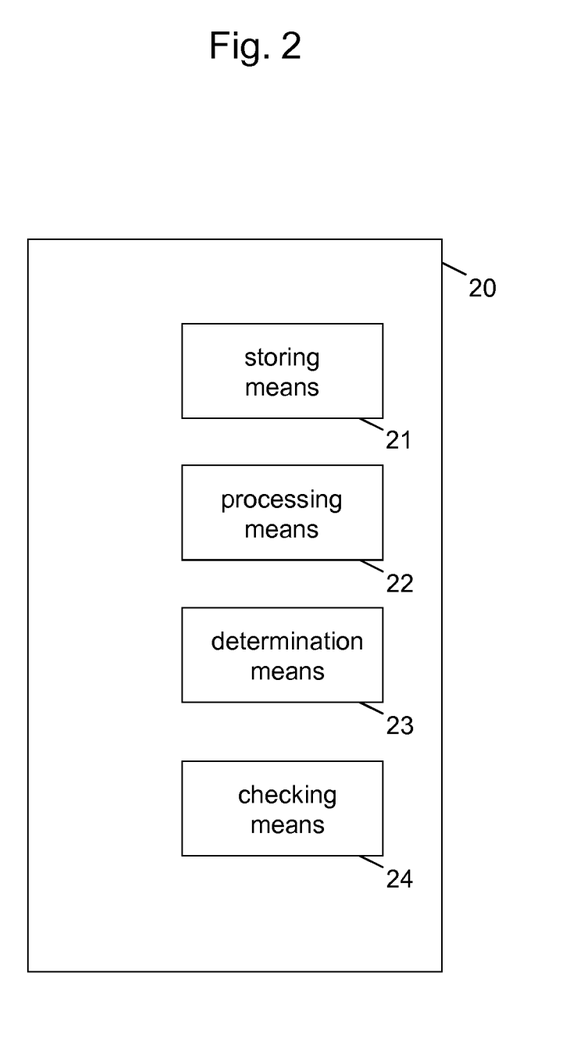
FIG. 2 shows a principle architecture of an example for an apparatus according to certain embodiments of the present invention.

FIG. 2 shows a principle configuration of an example for an apparatus according to certain embodiments of the present invention. The apparatus 20 comprises a storing means 21 adapted to store a network node identification and a vendor certificate, a processing means 22 adapted to request, upon installation of the network node in an operator network, a usage certificate for the network node, which is signed by the vendor with a signature, and contains verification information indicating that the usage certificate relates to this network node and authentication information for allowing the network node to authenticate a network, a determination means 23 adapted to determine validity of the signature in the usage certificate received upon the request, and a checking means 24 adapted to check whether the received usage certificate actually relates to the network node being initially connected to the operator network, based on the information contained in the usage certificate.

According to certain embodiments of the present invention, information provided in the network node during manufacturing are as follows:
  individual identification (id)
  individual private key device certificate: certificate for the public key belonging to the individual private key, signed by a vendor CA certificate of the vendor entity that is used to sign usage certificates The individual private key and the device certificate are needed to allow that the network authenticates the node. Together with certain embodiments of the present invention, facilitating the authentication of the network by the network node, a mutual authentication can be achieved.

Figure 3:
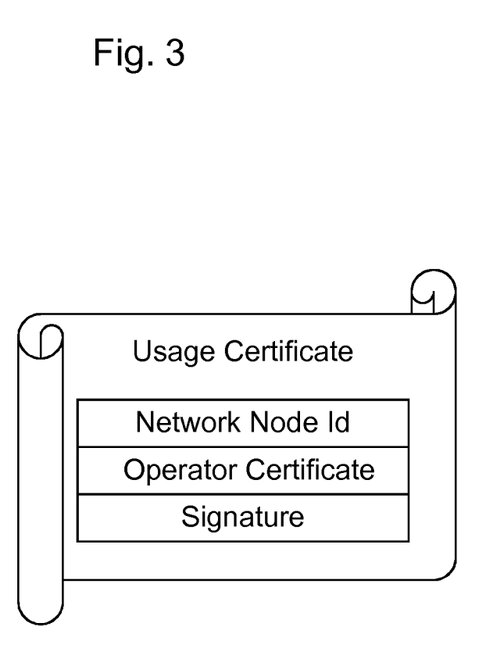
FIG. 3 illustrates the structure of the usage certificate according to certain embodiments of the invention.

The usage certificate according to certain embodiments of the present invention is illustrated in FIG. 3.

The usage certificate comprises:

network node id operator certificate signature (by vendor)

The semantics of the usage certificate are: The network node with the id contained in the usage certificate will operate (only) in a network which is in possession of the private key belonging to the public key in the operator certificate contained in the usage certificate.

Figure 4:
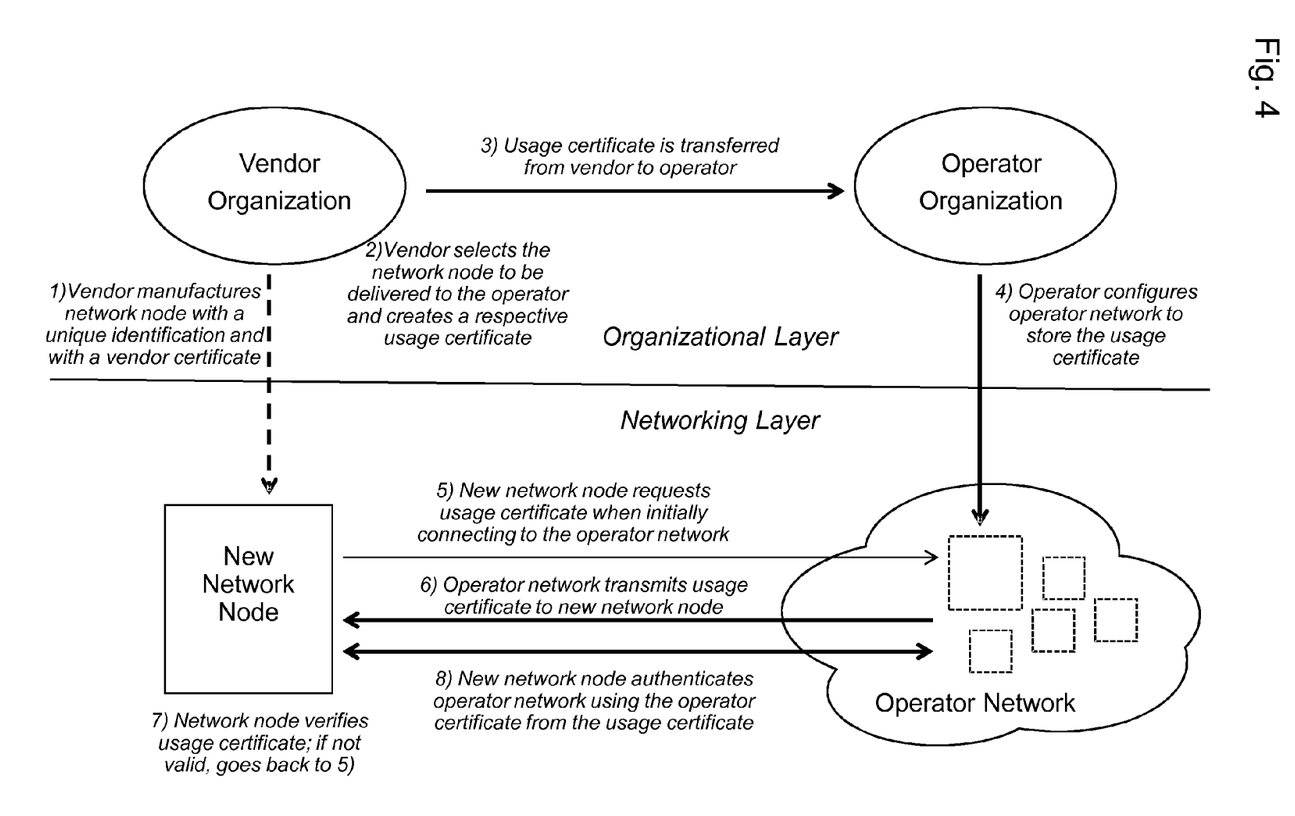
FIG. 4 illustrates the flow of the usage certificate between vendor, operator, operator network and new network node according to certain embodiments of the invention.

Furthermore, FIG. 4 illustrates the flow of the usage certificate according to certain embodiments of the present invention. That is, the usage certificate is created within the vendor organization and passed to the operator organization. It is then stored in the operator network. On request, it is passed to the new network node.

The network node is programmed in a way that when it is in its factory settings, it requests a usage certificate when it is initially connected to a network. The network node is programmed to verify a usage certificate it receives. The network node is programmed not to proceed its operation, as long as no valid usage certificate is received. When a valid usage certificate is received, the network node stores the operator certificate contained in the usage certificate. Subsequently, it uses this operator certificate to authenticate the network it is connected to.

In the following, a detailed description of the network connection procedure according to certain embodiments of the present the invention is provided.

Prerequisites:

The vendor manufactures the network nodes in a way that each network node contains an individual id, a private/public key pair, a certificate for the public key signed by a vendor CA and the certificate of the vendor entity that signs the usage certificates. All this information does not depend on the operator to which the network nodes will be delivered.

The operator has received the vendor CA certificate in a secure way and has configured it within the operator network, i.e. one or more network nodes have stored the vendor CA certificate as a trusted certificate.

The vendor has received an operator certificate in a secure way. The operator network is in possession of the respective private key.

Procedure:

The operator orders a new network node.

The vendor selects a manufactured network node with a given id to be delivered to the operator as new network node.

The vendor creates a usage certificate containing the selected network node's id, the operator certificate and a signature (i.e. it the usage certificate is signed by the vendor).

The vendor transmits the usage certificate to the operator.

The operator configures the id of the network node in the operator network (i.e. stores it in one or more nodes) so that the network is prepared to interconnect with the new network node.

The new network node is delivered to a site and connected to the operator's network. (This can be done by a third party without this party needing to have information about the other steps of the network connection procedure.)

When the new network node is connected to the operator's network and started, it receives an initial address of a node that can provide the usage certificate. (This initial address may be provided e.g. via DHCP, or in some other way.)

The new network node requests the usage certificate for its id.

The new network node may transmit its device certificate during this request, and the network may authenticate the new network node and cancel the procedure if it cannot authenticate the new network node.

The network sends the usage certificate to the new network node.

When the new network node receives a usage certificate it verifies the id and the signature.

As long as no valid usage certificate has been received, the new network node repeats the request but does not proceed otherwise.

When the new network node has received a valid usage certificate, it stores the operator certificate contained in the usage certificate.

The new network node and the network perform a mutual authentication based on the certificates and private keys stored in the new network node and in the network and set up a security association. (IKE or TLS may be used for this.)

The security association is used to transmit securely all configuration information to the new network node that is required for further operation.

According to certain embodiments of the present invention, usage certificates may comprise further information relevant for the configuration of the new network node or for the verification of the usage certificate. E.g., a usage certificate may contain more than one operator certificate, allowing a new network node to connect to a network that is in possession of at least one of the respective private keys. Another example is a validity time period—a new network node that has access to the current time could accept a usage certificate only during the validity time period.

A usage certificate could also comprise not only the id of the new network node, but the complete device certificate. The device certificate need not be stored in the new network node in this case. The new network node would only have to present its id and would not have to transmit a certificate.

Furthermore, according to certain embodiments of the invention, the usage certificate could contain a whole list of network node ids, e.g. all ids reserved for a particular large customer (network operator), and not only a single id. This would considerably reduce the effort of the vendor in generating the usage certificates. When validating such usage certificate, the network node needs to check whether its id is contained in the list of ids. The advantages of the present invention may also apply when the usage certificate is not stored in the operator network and transmitted to the network node via the network, but instead is manually configured e.g. by a field engineer during installation of the network node, wherein the advantage of using a "usage certificate" (as compared to installing an operator certificate directly) would then be enhanced security because the field engineer cannot manipulate this information, as opposed to the configuration of a mere operator root certificate, where the field engineer could install any certificate he may have made up for this purpose.

Still further, the internal structure of the usage certificate could be proprietary as it needs to be understood only by the network node of one vendor; if transmitted in a protocol, only the coding and size would have to be standardized, if manually configured into the network node, no standardization would be required.

The main advantages provided by the present invention are as follows. Using the present invention, the network node need not be pre-configured with an operator certificate (or any other operator specific information) by the vendor or by the operator. Therefore, operator and vendor efficiency requirements can be fulfilled. Also with the invention, mutual authentication can be done during the initial connection of the network node to the operator network (assuming that the network node is authenticated by the network, e.g. by means as described in prior art, see Approach 2) above), meaning that the security requirements are fulfilled and no attack window remains open.

It is not possible for an attacker to trick the network node into accepting a manipulated operator certificate, because the vendor will only sign a usage certificate containing a true operator certificate. The network node cannot be used in a network different from the operator network, as such a network will not own the private key belonging to the true operator certificate.

The procedure may comprise measures to make it hard for an attacker to obtain a usage certificate (e.g. passing it only to authenticated new network nodes, encrypting it during transfer between entities, if possible); however, the security of the procedure does not depend on this.

Compared to the Prior Art as indicated in the introductory part, the present invention offers at least the following advantages.

Approach 1) The invention provides superior security (authentication of the network by the network node).

Approach 2a) The invention provides the same security but does not require pre-configuration of the network node and thus provides the "plug and play" solution required by the operators.

Approach 2b) The invention provides superior security (mutual authentication instead of only authentication of the network node) and avoids the window of vulnerability present in 2b.

Compared to Approach 3 and 4) The invention allows to specify a single operator network where the node will be usable, so one operator cannot hijack a network node delivered for another operator.

Approach 3) The invention does not require to configure all possible operator certificates into the network node Approach 4) The invention avoids a dependency between the operator's and the vendor's PKIs.

Approach 5) With the invention, the vendor need not operate an enrolment server of his own. The operator need not care for connectivity between the network node and the vendor enrolment server. The vendor does not get involved into the operation of the operator network.

In the foregoing exemplary description of the apparatus, only the units that are relevant for understanding the principles of the invention have been described using functional blocks. The apparatuses may comprise further units that are necessary for its respective function. However, a description of these units is omitted in this specification. The arrangement of the functional blocks of the apparatuses is not construed to limit the invention, and the functions may be performed by one block or further split into sub-blocks.

According to exemplarily embodiments of the present invention, a system may comprise any conceivable combination of the thus depicted devices/apparatuses and other network elements, which are arranged to cooperate as described above.

Embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under GSM, HSDPA, UMTS, LTE, WCDMA, WIMAX and WLAN and can advantageously be implemented also in controllers, base stations, user equipments or smart phones, or personal computers connectable to such networks. That is, it can be implemented e.g. as/in chipsets to connected devices.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following meanings for the abbreviations used in this specification apply:
3GPP Generation Partnership Program
CA Certificate Authority
eNB evolved Node B
EPS Evolved Packet System
PKI Public Key Infrastructure

What is claimed is:

1. A method executed at a network node, the method comprising:
   storing a network node identification and a vendor certificate on the network node, wherein the network node is a base station;
   requesting, upon installation of the network node in an operator network, a usage certificate for the network node from an operator of an operator network, which is signed by a vendor with a signature, and contains verification information identifying the network node and authentication information for allowing the network node to authenticate the operator network, wherein the usage certificate restricts usage of the network node such that the network node is prevented from operating in networks other than the operator network;
   verifying the validity of the signature in the usage certificate received from the request based upon the vendor certificate; and
   storing the usage certificate upon validating that the received usage certificate relates to the network node being initially connected to the operator network, based on verifying the verification information, and verifying the authentication information contained in the usage certificate,
   wherein the network node and operator network utilize the usage certificate to perform mutual authentication and establish a security association.

2. The method according to claim 1, wherein the authentication information comprises at least one operator certificate.

3. The method according to claim 1, wherein the network node identification comprises a single individual network node identification the method further comprising checking whether the network node identification of the network node being initially connected to the operator network coincides with the single network node identification.

4. The method according to claim 1, wherein the network node identification comprises a plurality of network node identifications, the method further comprising checking whether the network node identification of the network node being initially connected to the operator network is comprised in the plurality of network node identifications.

5. The method according to claim 1, wherein the usage certificate is signed by a certificate linked to the usage certificate via a certificate chain that is comprised in the usage certificate.

6. The method according to claim 1, wherein the usage certificate is designated to a specific validity period, the method further comprising checking whether the validity period of received usage certificate has elapsed or not.

7. The method according to claim 1, wherein when the signature in the usage certificate received upon the request by the network node is determined to be at least one of 1) invalid and 2) the received usage certificate does not relate to the network node being initially connected to the operator network, the network node prohibits authenticating the network and repeats requesting the usage certificate from the operator.

8. The method according to claim 1, wherein the usage certificate is embedded in the operator network, and is transmitted to the network node via the operator network.

9. The method according to claim 1, wherein the usage certificate transmitted to the operator is transmitted to the network node by means outside of the operator network when the network node is initially connected to the operator network.

10. A network node apparatus, comprising:
    at least one processor; and
    at least one memory including computer program code,
    wherein the at least one memory and the computer program code are configured to, with the at least one processor, cause the network node apparatus at least to:
    store a network node identification and a vendor certificate on the network node apparatus, wherein the network node apparatus is a base station;
    request, upon installation of the network node in an operator network, a usage certificate for the network node from an operator of an operator network, which is signed by the vendor with a signature, and contains verification information identifying the network node apparatus and authentication information for allowing the network node apparatus to authenticate the operator network, wherein the usage certificate restricts usage of the network node apparatus such that the network node apparatus is prevented from operating in networks other than the operator network;
    verify the validity of the signature in the usage certificate received from the request based on the vendor certificate; and
    store the usage certificate upon validating that the received usage certificate relates to the network node apparatus being initially connected to the operator network, based on verifying the verification information, and verifying the authentication information contained in the usage certificate,
    wherein the network node apparatus and the operator network utilize the usage certificate to perform mutual authentication and establish a security association.

11. The apparatus according to claim 10, wherein the authentication information comprises at least one operator certificate.

12. The apparatus according to claim 10, wherein the network node identification comprises a single individual network node identification, and the at least one memory and the computer program code are further configured to, with the at least one processor, cause the apparatus at least to check whether the network node identification of the network node apparatus being initially connected to the operator network coincides with the single network node identification.

13. The apparatus according to claim 10, wherein the network node identification comprises a plurality of network node identifications, and the at least one memory and the computer program code are further configured to, with the at least one processor, cause the apparatus at least to check whether the network node identification of the network node apparatus being initially connected to the operator network is comprised in the plurality of network node identifications.

14. The apparatus according to claim 10, wherein the usage certificate is signed by a certificate linked to the usage certificate via a certificate chain that is comprised in the usage certificate.

15. The apparatus according to claim 10, wherein the usage certificate is designated to a specific validity period, and the at least one memory and the computer program code are further configured to, with the at least one processor, cause the apparatus at least to check whether the validity period of received usage certificate has elapsed or not.

16. The apparatus according to claim 10, wherein when the signature in the usage certificate received upon the request by the network node apparatus is determined to be at least one of 1) invalid and 2) the received usage certificate does not relate to the network node apparatus being initially connected to the operator network, the at least one memory and the computer program code are further configured to, with the at least one processor, cause the apparatus at least to prohibit authenticating the operator network and to repeat requesting the usage certificate from the operator.

17. The apparatus according to claim 10, wherein the usage certificate is embedded in the operator network, and is transmitted to the network node apparatus via the operator network.

18. The apparatus according to claim 10, wherein the usage certificate transmitted to the operator is transmitted to the network node apparatus by means outside of the operator network when the network node apparatus is initially connected to the operator network.

19. A computer program product embodied on a non-transitory computer-readable medium, said product comprising computer-executable components which, when the program is run on a processing device of a network node, control the processing device to:
  store a network node identification and a vendor certificate on a network node, wherein the network node is a base station;
  request, upon installation of the network node in an operator network, a usage certificate for the network node from an operator of an operator network, which is signed by a vendor with a signature, and contains verification information identifying the network node and authentication information for allowing the network node to authenticate the operator network, wherein the usage certificate restricts usage of the network node such that the network node is prevented from operating in networks other than the operator network;
  verify the validity of the signature in the usage certificate received from the request based on the vendor certificate; and
  store the usage certificate upon validating that the received usage certificate relates to the network node being initially connected to the operator network, based on verifying the verification information, and verifying the authentication information contained in the usage certificate,
  wherein the network node and operator network utilize the usage certificate to perform mutual authentication and establish a security association.

* * * * *